United States Patent
Markiton et al.

(10) Patent No.: US 7,554,483 B2
(45) Date of Patent: Jun. 30, 2009

(54) METHOD AND DEVICE FOR DETERMINING A DECISION HEIGHT DURING AN AUTONOMOUS APPROACH OF AN AIRCRAFT

(75) Inventors: Vincent Markiton, Fontenilles (FR); Stéphane Dattler, Montlaur (FR)

(73) Assignee: Airbus France, Toulouse (FR)

( * ) Notice: Subject to any disclaimer, the term of this patent is extended or adjusted under 35 U.S.C. 154(b) by 71 days.

(21) Appl. No.: 11/831,671

(22) Filed: Jul. 31, 2007

(65) Prior Publication Data

US 2008/0150785 A1 Jun. 26, 2008

(30) Foreign Application Priority Data

Aug. 2, 2006 (FR) .................... 06 07043

(51) Int. Cl.
*G01S 13/93* (2006.01)
(52) U.S. Cl. .......................... 342/33; 342/35
(58) Field of Classification Search .............. 342/29–37
See application file for complete search history.

(56) References Cited

U.S. PATENT DOCUMENTS

| 5,499,025 | A | * | 3/1996 | Middleton et al. | .......... 340/959 |
| 5,623,414 | A | | 4/1997 | Misra | |
| 5,666,111 | A | * | 9/1997 | Servat et al. | ................ 340/980 |
| 5,702,070 | A | | 12/1997 | Waid | |
| 5,719,567 | A | * | 2/1998 | Norris | ........................ 340/953 |
| 5,945,943 | A | | 8/1999 | Kalafus et al. | |
| 6,038,498 | A | * | 3/2000 | Briffe et al. | ..................... 701/3 |
| 6,199,008 | B1 | * | 3/2001 | Aratow et al. | ............... 701/120 |
| 6,591,171 | B1 | * | 7/2003 | Ammar et al. | ................ 701/16 |
| 7,302,318 | B2 | * | 11/2007 | Gerrity et al. | ................. 701/16 |
| 7,394,402 | B2 | * | 7/2008 | Ishihara et al. | .............. 340/968 |

(Continued)

FOREIGN PATENT DOCUMENTS

EP 1464576 10/2004

(Continued)

OTHER PUBLICATIONS

E. Kaplan, et al. "Understanding GPS Principles and Applications" Second Edition, Artech House, Inc., 2006, pp. 346-361.

(Continued)

*Primary Examiner*—John B Sotomayor
(74) *Attorney, Agent, or Firm*—Dickinson Wright, PLLC

(57) ABSTRACT

The subject of the invention is a method of aiding the piloting of an aircraft (3), which is intended to aid the piloting of the aircraft during an autonomous approach to a landing runway (P) for the purpose of landing, said aircraft comprising at least one locating means (10, 12), wherein:

a) an estimated instant of arrival of the aircraft on the runway is determined;

b) a prediction of the performance of said locating means of the aircraft at least at this instant of arrival is determined; and c) on the basis of said performance of the locating means and of characteristics of said approach, at least one minimum decision height (Hmin) corresponding to this instant of arrival is determined, above which the aircraft is protected from the risks of collision with the environment when it is guided automatically onto an approach axis (A) corresponding to said approach.

The invention also relates to a device for implementing this method.

19 Claims, 3 Drawing Sheets

U.S. PATENT DOCUMENTS

| | | | |
|---|---|---|---|
| 7,479,925 B2 * | 1/2009 | Schell | 342/455 |
| 7,495,600 B2 * | 2/2009 | Rees et al. | 342/29 |
| 7,495,612 B2 * | 2/2009 | Smith | 342/450 |
| 7,499,773 B2 * | 3/2009 | Pire et al. | 701/3 |
| 7,522,977 B2 * | 4/2009 | Foucart et al. | 701/16 |
| 2004/0245408 A1 | 12/2004 | Peyrucain et al. | |
| 2005/0270180 A1 * | 12/2005 | Ishihara et al. | 340/968 |
| 2006/0214816 A1 * | 9/2006 | Schell | 340/961 |
| 2006/0253232 A1 * | 11/2006 | Gerrity et al. | 701/16 |
| 2008/0150785 A1 * | 6/2008 | Markiton et al. | 342/33 |
| 2008/0172149 A1 * | 7/2008 | Rouquette et al. | 701/16 |
| 2008/0269966 A1 * | 10/2008 | Markiton et al. | 701/16 |
| 2009/0073024 A1 * | 3/2009 | King et al. | 342/30 |

FOREIGN PATENT DOCUMENTS

WO    WO 2007080314 A2 *    7/2007

OTHER PUBLICATIONS

Preliminary Search Report dated Mar. 9, 2007.

\* cited by examiner

METHOD AND DEVICE FOR DETERMINING A DECISION HEIGHT DURING AN AUTONOMOUS APPROACH OF AN AIRCRAFT

The present invention relates to a method and a device for aiding the piloting of an aircraft, which are intended to aid the piloting of the aircraft during an autonomous approach to a landing runway for the purpose of landing.

Within the framework of the present invention, it is considered that an autonomous approach must make it possible to fly the aircraft, without using navigation means situated on the ground, under instrument flight meteorological conditions of IMC ("Instrument Meteorological Conditions") type, to a decision height which corresponds to the decision height of a standard precision approach of ILS ("Instrument Landing System") type of the same category as said autonomous approach. This decision height is for example equal to: 200 feet (about 60 meters) for a category 1 approach; to 100 feet (about 30 meters) for a category 2 approach; to 50 feet (about 15 meters) for a category 3A approach; to zero for a category 3B approach. During an autonomous approach such as this, the locating means used by the aircraft are therefore exclusively onboard means, and in particular a satellite positioning system, for example of GPS ("Global Positioning System") type, an inertial platform, and barometric sensors. The approach may also be effected without any air space controller. At said decision height, the crew of the aircraft must acquire the runway visually. If such is the case, they finish the landing in fly-by-sight mode with the aid of manual guidance. On the other hand, if at this decision height, the crew does not see the runway, they must perform a go-around so as to make the aircraft climb back to a predetermined safety altitude. The approach trajectory used to carry out an autonomous approach such as this is created before the flight and described on a paper chart which is available to the crew during the flight. To do this, the configuration of the terrain around the landing runway has been analyzed and margins vis-à-vis obstacles have been defined. This approach trajectory is also saved in a database of the aircraft's piloting system.

Said margins vis-à-vis obstacles, defined for the autonomous approach, are generally determined in a similar way to those of a precision approach of ILS type of the same category as said autonomous approach. Consequently, the aircraft performance required to fly this autonomous approach is the same as that required to fly said precision approach. However, to implement such a precision instrument approach of ILS type, standard use is made of ground stations which are situated at the runway verge and at least one specialized radio receiver mounted onboard the aircraft, which provides horizontal and vertical guidance before and during landing by presenting the pilot with the lateral deviation with respect to an approach axis and the vertical deviation with respect to a descent plan. Such a precision instrument approach affords significant and efficacious assistance with landing, in particular in poor visibility (fog, etc.) or in the absence of visibility. Such a precision instrument approach therefore uses information received from outside. This is not the case in the autonomous approach considered in the present invention, for which the guidance aid is achieved exclusively with the aid of onboard means, as indicated hereinabove.

The performance of the aircraft breaks down principally into a location component and a guidance component. The guidance component makes it possible to evaluate the ability of the aircraft to follow the approach axis considered with a certain precision. The locating component, on the other hand, makes it possible to guarantee the effective position of the aircraft. This performance is considered both in the vertical plane and in the horizontal plane.

In the case of a precision instrument approach of ILS type, the horizontal and vertical guidance presented to the pilot of the aircraft corresponds to angular deviations with respect to this approach axis and to this vertical plane. For a given angular deviation, the distance between the actual position of the aircraft and said approach axis (respectively said vertical plane) is always smaller, the smaller the distance between the aircraft and the landing runway. Consequently, the precision of the location component increases as the aircraft approaches the landing runway. This is illustrated in FIG. 2 which is a vertical sectional view along a vertical plane containing an approach axis A of the approach considered, for the purpose of landing on a landing runway P. A position uncertainty zone, corresponding to the precision of the location component, is defined around the approach axis A. This zone is delimited vertically at the top by a plane which cuts said vertical plane along a straight line $Z1a$ and at the bottom by a plane which cuts said vertical plane along a straight line $Z1b$. These two straight lines converge on approaching the landing runway P.

In the case of the autonomous approach considered, the precision of the location component depends essentially on that of the locating means onboard the aircraft, in particular the satellite positioning system, for example of GPS type. Now, it is known that the positioning precision of such a satellite positioning system varies over time, at a given place. This precision is dependent on the configuration of the satellites with respect to the aircraft: in particular the number of satellites whose signals are received by said aircraft positioning system and their position in relation to this aircraft. Just as for the aforesaid precision instrument approach, a position uncertainty zone, corresponding to the precision of the location component, is defined around the approach axis A. This zone is delimited vertically at the top by a plane which cuts said vertical plane along a straight line $Z2a$ and at the bottom by a plane which cuts said vertical plane along a straight line $Z2b$. At a given instant, these two straight lines are substantially parallel.

In contradistinction to the precision of the locating component corresponding to a precision instrument approach of ILS type, the precision of the location component corresponding to said autonomous approach does not increase as the aircraft approaches the landing runway. Moreover, as indicated previously, this precision varies over time. In a certain number of cases, the straight lines $Z1a$ and $Z2a$ cut one another at a point La and the straight lines $Z1b$ and $Z2b$ cut one another at a point Lb. These two points La and Lb are limit points below which the precision of the location component corresponding to the autonomous approach is not as good as the precision of the location component corresponding to the precision instrument approach. It is reckoned that in the case of an autonomous approach corresponding to a precision instrument approach of ILS type of category 1, whose decision height is equal to 200 feet (about 60 meters), by using a positioning system based on the use of GPS-type position information hybridized with information emanating from the inertial and/or barometric systems of the aircraft, the aircraft performance required to fly this autonomous approach as far as said decision height, would not always be attained. In cases where this performance would not be attained, the pilots could not fly said autonomous approach, and this would be very penalizing with respect to the mission of the aircraft.

The object of the present invention is to remedy the aforesaid drawbacks. It relates to a method of aiding the piloting of an aircraft, which is intended to aid the piloting of the aircraft during an autonomous approach to a landing runway for the purpose of landing, said aircraft comprising at least one locating means.

This method is noteworthy in that it comprises the following steps:

a) an estimated instant of arrival of the aircraft on the runway is determined;
b) a prediction of the performance of said locating means of the aircraft at least at this instant of arrival is determined; and
c) on the basis of said performance of the locating means and of characteristics of said approach, at least one minimum decision height corresponding to this instant of arrival is determined, above which the aircraft is protected from the risks of collision with the environment when it is guided automatically onto an approach axis corresponding to said approach.

Thus, the performance of the aircraft is guaranteed to be sufficient to fly the autonomous approach considered, as far as this minimum decision height.

Preferably, this method comprises, moreover, a step d) in which, at least this minimum decision height is presented to a pilot of the aircraft on a viewing screen of a viewing means of the cockpit of the aircraft.

In a particular embodiment of the invention:

in step a), a plurality of instants lying in a time interval surrounding said instant of arrival of the aircraft on the runway is moreover determined;
in step b), performance of said locating means of the aircraft at each of said instants determined in step a) is moreover determined;
in step c), a minimum decision height at each of said instants is moreover determined on the basis of said performance of said locating means of the aircraft at each instant considered and of said characteristics of the approach.

Preferably, in step d), at least said decision height corresponding to each of said instants is presented to a pilot of the aircraft on a viewing screen of a viewing means of the cockpit of the aircraft.

This particular embodiment of the invention affords the pilot values of minimum decision height at various instants before and after the estimated instant of arrival of the aircraft on the runway. In this way, the pilot is informed of the decision height that he would have to use if the arrival of the aircraft on the runway was early or late with respect to this estimated instant of arrival.

Advantageously, steps a), b), c), and d) are performed repetitively during the flight of the aircraft, starting from the moment at which the autonomous approach considered is inserted into the flight plan of the aircraft. This allows the predicted value of minimum decision height to be updated.

In a preferred embodiment of the invention, in step c), said characteristics of the approach comprise OASs ("Obstacle Assessment Surfaces") such as defined in the document PANS-OPS (doc 8168) of the ICAO (International Civil Aviation Organization), as well as a published decision height.

Advantageously, to determine a minimum decision height at an instant, step c) comprises the following steps:

c1) a first zone of uncertainty of position of the aircraft is determined, corresponding to the precision of the location component of a precision instrument approach which would have the approach axis of said autonomous approach as approach axis;
c2) a second zone of uncertainty of position of the aircraft is determined at least on the basis of the performance of the positioning system at this instant;
c3) the minimum decision height is determined in such a way that a margin between the first position uncertainty zone and the OAS protection surfaces corresponds to a margin between the second position uncertainty zone and the OAS protection surfaces.

In this way it is guaranteed that at the minimum decision height, the margin between the second position uncertainty zone, corresponding to the aircraft position uncertainty during the autonomous approach considered, and the OAS protection surfaces is substantially identical to the margin between the first position uncertainty zone, corresponding to the aircraft position uncertainty during said precision instrument approach, and the OAS protection surfaces. Consequently, this makes it possible to guarantee that during said autonomous approach, the aircraft is protected from a risk of collision with the terrain as much as during a precision instrument approach which would have the same approach axis as this autonomous approach.

In a first variant of the preferred embodiment, in step c3), the minimum decision height corresponds to:

the height of a point of the approach axis for which the margin between the first position uncertainty zone and the OAS protection surfaces corresponds to the margin between the second position uncertainty zone and the OAS protection surfaces if said height is greater than or equal to the published decision height for this approach and if said point of the approach axis can be determined;
the published decision height otherwise.

In a second variant of the preferred embodiment, to determine a minimum decision height at an instant, step c3) comprises the following steps:

c3a) the margin between the first position uncertainty zone and the OAS protection surfaces at the point of the approach axis whose height is equal to the published decision height is determined;
c3b) a point of the approach axis for which the margin between the second position uncertainty zone and the OAS protection surfaces corresponds to the margin determined in step c3a) is determined;
c3c) the minimum decision height is determined, equal to:
the height of the point determined in step c3b) if the latter is greater than or equal to the published decision height;
the published decision height otherwise.

In another embodiment of the invention, in step c), said characteristics of the approach comprise a predetermined correspondence table making it possible to determine a minimum decision height on the basis of the performance of a locating means of the aircraft, and this correspondence table is used to determine the minimum decision height on the basis of the prediction, determined in step b) of the performance of the locating means of the aircraft at the instant of arrival of the aircraft on the runway. This embodiment is advantageous insofar as it makes it possible to determine the minimum decision height in a simple and fast manner, by using said correspondence table. This correspondence table, stored in a database of the aircraft, may for example have been formulated using the principles stated above in respect of the preferred embodiment.

In a preferred manner, the decision height published in respect of the autonomous approach is dependent on the category of said autonomous approach. As indicated previously, this category is the same as that of the corresponding precision instrument approach, having the same approach axis as this autonomous approach.

Advantageously, once the minimum decision height has been determined, the aircraft is guided automatically onto the approach axis corresponding to the autonomous approach considered, until said minimum decision height is attained. Again advantageously, when the aircraft attains the minimum decision height, in the absence of any action from the pilot to manually continue the descent towards the landing runway, an alarm is emitted in the cockpit of the aircraft. This makes it possible to forewarn the pilot of a possible risk of collision of the aircraft with terrain.

In a particular embodiment of the invention, moreover, during the autonomous approach, the value of the actual performance of said locating means of the aircraft is monitored and an alarm is emitted if said value is less than a predetermined value of performance. In a first variant, this predetermined value of performance is chosen equal to the predicted value of the performance, determined in step b). Thus, it is guaranteed that if the actual performance of the locating means of the aircraft is not as good as the predicted performance, the pilot will be informed thereof and will be able to interrupt the autonomous approach so as to avoid any risk of collision with the terrain. In a second variant, this predetermined value of performance is chosen equal to a value corresponding to performance making it possible to fly this autonomous approach as far as a predetermined decision height. This makes it possible to adapt the monitoring of the performance of said locating means of the aircraft to a performance level necessary for flying the precision approach as far as a decision height chosen by the pilot.

The invention also relates to an aircraft comprising a device capable of implementing the aforesaid method.

The invention also pertains to a device for aiding the piloting of an aircraft comprising:
  a set of standard locating means, comprising at least one satellite locating means;
  a database which contains at least information relating to a set of autonomous approaches;
  a flight management system which receives information from said database and which comprises:
    a means for calculating an instant of arrival of the aircraft on the runway;
    a means for predicting the performance of said satellite locating means at said instant of arrival of the aircraft on the runway;
    a means of calculating, on the basis of said performance of the satellite locating means and of characteristics of the autonomous approach considered, which emanate from said database, a minimum decision height, corresponding to this instant of arrival, above which the aircraft is protected from the risks of collision with the environment when it is guided automatically onto an approach axis corresponding to the autonomous approach considered.

Preferably, the database is integrated into the flight management system.

Advantageously, this device for aiding piloting comprises a guidance system comprising a means for comparing the value of the actual performance of said locating means with a predetermined value of performance, able to emit an alarm when said value of the actual performance is less than said predetermined performance value.

The invention also relates to an aircraft comprising such a device for aiding piloting.

The invention will be better understood on reading the description which follows and on examining the appended figures.

FIG. 1 is a schematic diagram of a device for aiding the piloting of an aircraft during an autonomous approach, in accordance with the invention;

FIG. 2, already described, is a vertical sectional view along a plane containing an approach axis, representing zones of uncertainty of the position of the aircraft in the case of a precision instrument approach and in the case of an autonomous approach along this approach axis;

Figure 1:
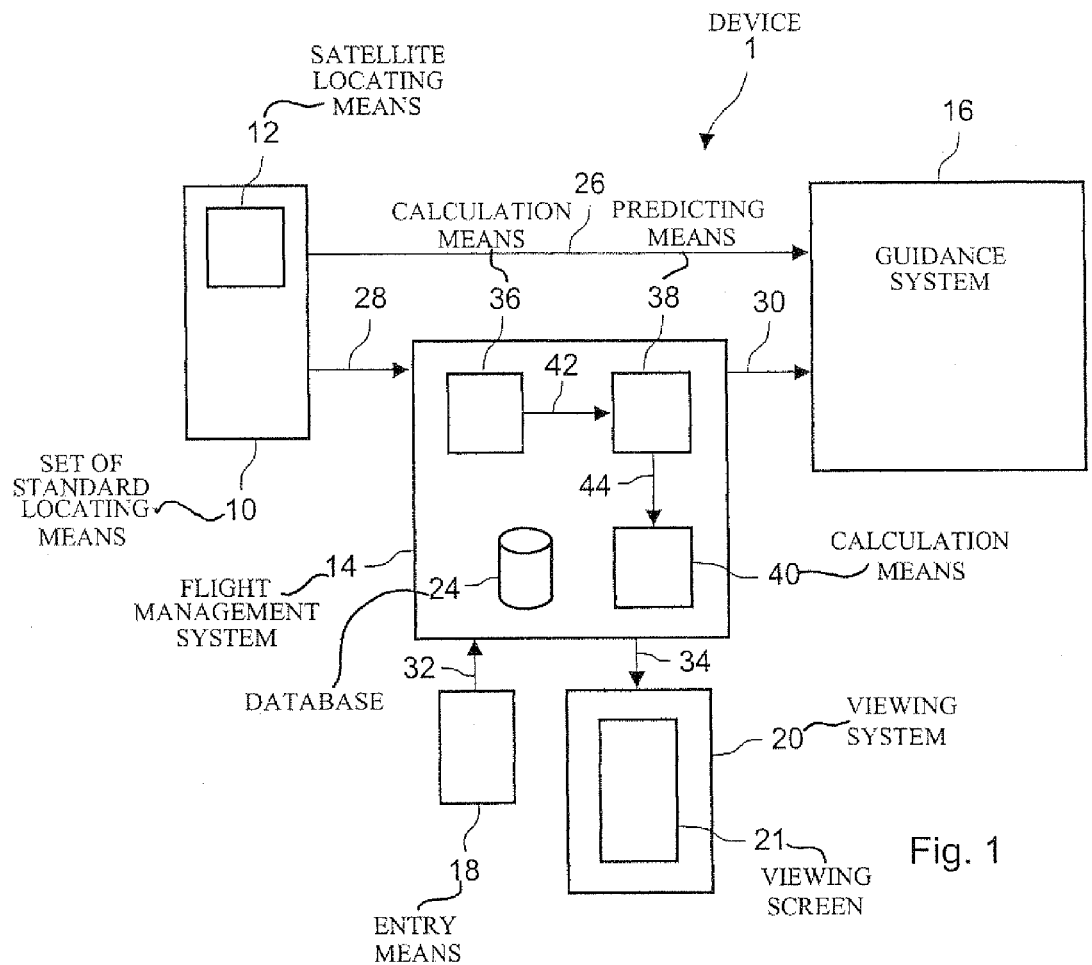

The device 1 in accordance with the invention is represented diagrammatically in FIG. 1. It is carried onboard an aircraft 3, in particular a civil transport plane or a military transport plane, capable of flying an autonomous approach to a landing runway P for the purpose of landing.

To do this, the device 1 in accordance with the invention comprises:
  a set 10 of standard locating means, comprising at least one satellite locating means 12 (for example of GPS type);
  a database 24 which contains at least information relating to a set of autonomous approaches;
  a flight management system 14, for example of FMS ("Flight Management System") type which receives information from said database 24 and which comprises:
    a means 36 for calculating an instant of arrival of the aircraft on the runway;
    a means 38 for predicting the performance of said satellite locating means 12 at said instant of arrival of the aircraft on the runway. This prediction means 38 uses the value of the position of the landing runway coded in the database 24 and it receives the value of the instant of arrival of the aircraft on the runway from said calculation means 36, via a link 42;
    a calculation means 40, which receives a prediction of the performance of the satellite locating means of the prediction means 38 via a link 44, and which calculates on the basis of said performance of the satellite locating means and of characteristics of the autonomous approach considered, which emanate from said database 24, a minimum decision height Hmin, corresponding to this instant of arrival, above which the aircraft is protected from the risks of collision with the environment when it is guided automatically onto an approach axis A corresponding to the autonomous approach considered.

Preferably, as represented in FIG. 1, the database 24 is integrated into the flight management system 14.

Advantageously, the flight management system 14 transmits the value of the minimum decision height Hmin to a viewing system 20 of the cockpit of the aircraft. This viewing system 20 displays this value on a viewing screen 21.

The autonomous approach considered is chosen by the pilot(s) prior to implementing the method. The pilot enters the approach chosen with the aid of an entry means 18, for example a keyboard and/or a mouse, connected to the flight management system 14 by a link 32.

In an embodiment of the invention, the prediction of the performance of the satellite locating means 12, by said means 38, may be achieved according to an algorithm of RAIM (Receiver Autonomous Integrity Monitoring) type. An exemplary RAIM algorithm is described in the work "understanding GPS: principles and applications" (authors: Elliott D.

KAPLAN and Christopher J. HEGARTY—second edition—ARTECH HOUSE—ISBN 1-58053-894-0).

Figure 3A:
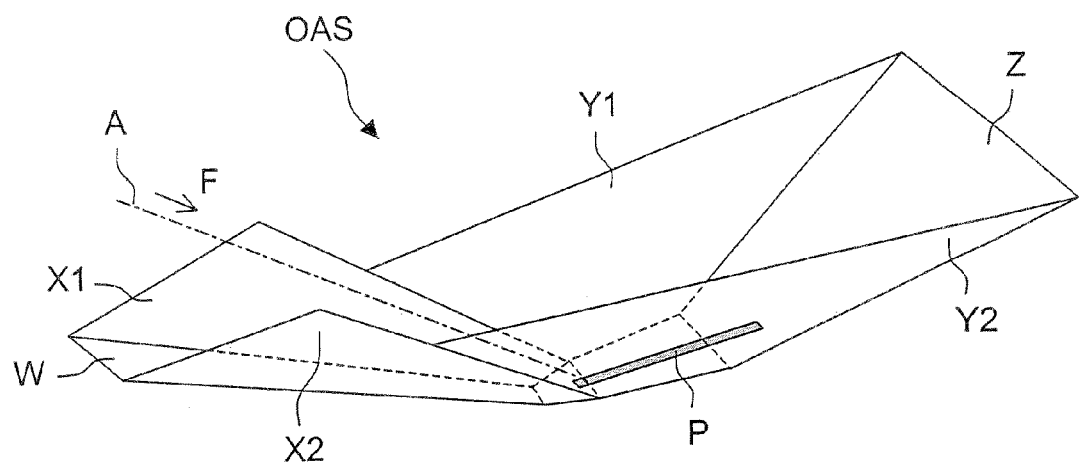
FIGS. 3a and 3b represent OAS protection surfaces during an approach to a landing runway, respectively in a perspective view and viewed from above.
Figure 3B:
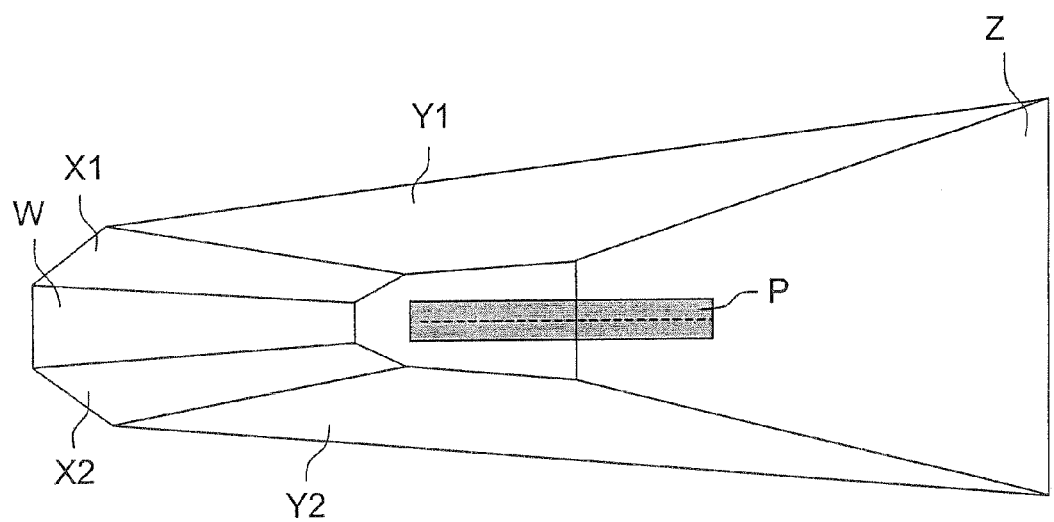

Said characteristics of the autonomous approach that emanate from the database 24 comprise OAS protection surfaces and a published decision height Hpub. Such OAS protection surfaces, comprising a set of plane surfaces X1, X2, W, Y1, Y2 and Z are represented by way of example in FIGS. 3a and 3b. They delimit a volume of space, comprising the approach axis A, inside which the aircraft can fly (in the direction of the arrow F) without any risk of collision with the environment, having regard to the precision of the location component corresponding to a precision instrument approach of ILS type.

To determine a minimum decision height Hmin at an instant:
- a first zone Z1 of uncertainty of position of the aircraft is determined, corresponding to the precision of the location component of a precision instrument approach which would have the approach axis A of said autonomous approach as approach axis;
- a second zone Z2 of uncertainty of position of the aircraft is determined at least on the basis of the performance of the positioning system at this instant;
- said minimum decision height Hmin is determined in such a way that a margin between the first position uncertainty zone Z1 and the OAS protection surfaces corresponds to a margin between the second position uncertainty zone Z2 and the OAS protection surfaces.

Figure 4:
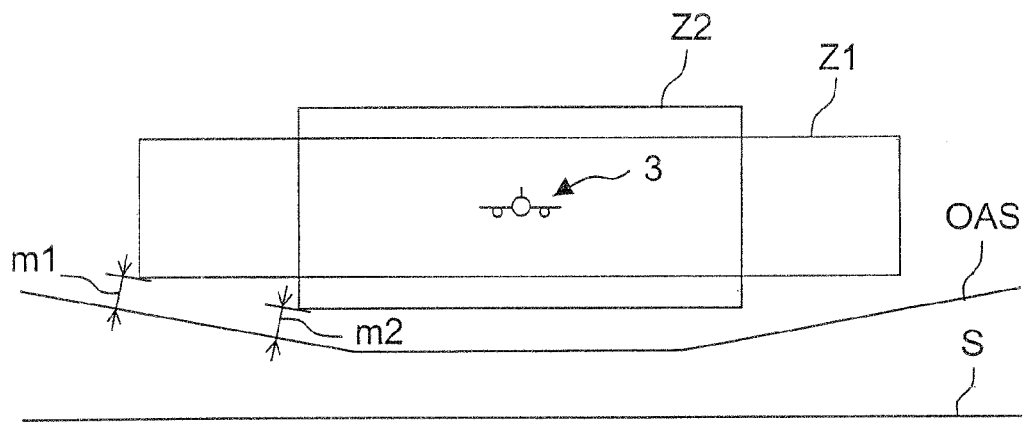
FIG. 4 illustrates a first variant of a preferred embodiment of the invention.

According to a first variant illustrated by FIG. 4, the minimum decision height Hmin corresponds to the height of a point of the approach axis A for which the margin m1 between the first position uncertainty zone Z1 and the OAS protection surfaces corresponds to the margin m2 between the second position uncertainty zone Z2 and the OAS protection surfaces, if said height is greater than or equal to the published decision height Hpub for this approach and if said point of the approach axis can be determined. Otherwise, Hmin is chosen equal to the published decision height Hpub.

Figure 5A:
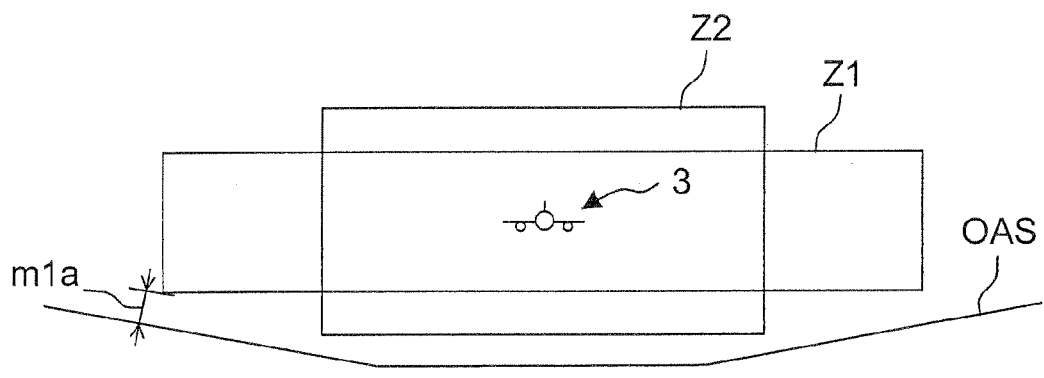
FIGS. 5a and 5b illustrate a second variant of a preferred embodiment of the invention.
Figure 5B:
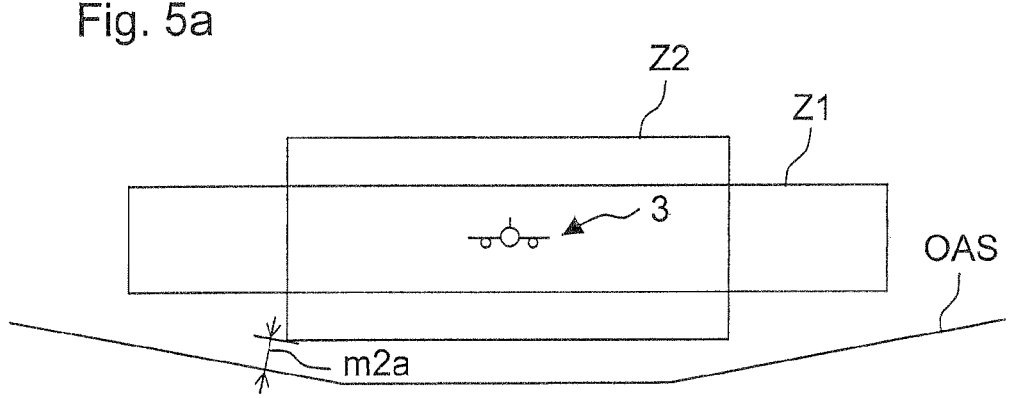

According to a second variant illustrated by FIGS. 5a and 5b, to determine the minimum decision height Hmin:
- the margin m1a between the first position uncertainty zone Z1 and the OAS protection surfaces at the point of the approach axis whose height is equal to the published decision height Hpub is determined (FIG. 5a);
- a point of the approach axis for which the margin m2a between the second position uncertainty zone Z2 and the OAS protection surfaces corresponds to the margin m1a determined in the preceding step is determined (FIG. 5b);
- the minimum decision height Hmin is determined, equal to the height of the point determined in the preceding step if the latter is greater than or equal to the published decision height Hpub and if said point of the approach axis can be determined. Otherwise, Hmin is chosen equal to the published decision height Hpub.

Figure 2:
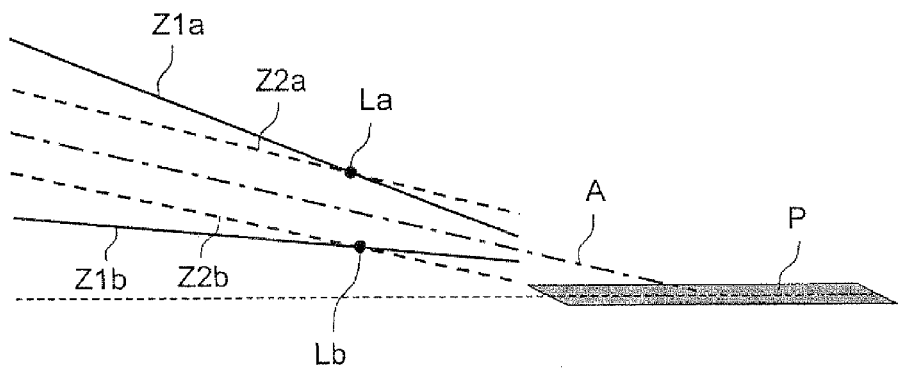

The rectangles representing the position uncertainty zones Z1 and Z2 in FIGS. 4, 5a and 5b correspond to sections through said position uncertainty zones along vertical planes perpendicular to a vertical plane containing the approach axis A of the aircraft. The upper and lower limits of the position uncertainty zones Z1 and Z2 represented in FIGS. 4, 5a and 5b correspond respectively to the limits represented by the straight lines Z1a, Z2a and Z1b, Z2b in FIG. 2.

In a particular embodiment of the invention, after having determined the minimum decision height Hmin, during the autonomous approach phase, the aircraft is guided automatically onto the approach axis A corresponding to said approach, until said minimum decision height Hmin is attained.

A guidance system 16 of the aircraft, for example a computer of FG ("Flight Guidance Computer") type, receives information from the flight management system 14, via a link 30. It also receives aircraft position information from the set of locating means 10, via a link 26.

Advantageously, when the aircraft attains the minimum decision height Hmin, if the pilot does not perform any action to manually continue the descent towards the landing runway, the guidance system 16 of the aircraft emits an alarm. This makes it possible to forewarn the pilot of a possible risk of collision of the aircraft with the terrain.

Preferably, during the autonomous approach the guidance system 16 of the aircraft monitors the value of the actual performance of said aircraft locating means 12. This guidance system comprises a means for comparing said value of the actual performance of the aircraft locating means with a predetermined value of performance.

In a first variant, this predetermined value of performance is chosen equal to the value of the performance of said locating means as predicted by the prediction means 38 of the flight management system 14, and received via the link 30. The guidance system emits an alarm if said actual value of the performance is less than the predicted value. Thus, it is ensured that the actual performance of the aircraft during the autonomous approach is sufficient to make it possible to fly this autonomous approach without any risk as far as the minimum decision height Hmin means. The guidance system 16 can in particular transmit this alarm to an alarm computer of the aircraft, for example of FWC ("Flight Warning Computer") type which supervises the display of this alarm on a viewing means of the cockpit of the aircraft and/or supervises the emission of an audible signal. In case of an alarm, the pilot can interrupt the autonomous approach so as to avoid any risk of collision with the terrain.

In a second variant this predetermined value of performance is chosen equal to a value corresponding to performance making it possible to fly the autonomous approach considered as far as a predetermined decision height. This predetermined decision height may be chosen by the pilot on the basis of the minimum decision height Hmin of the published decision height Hpub: the pilot can for example chose the larger of the heights Hpub and Hmin, or a value greater than these if he wishes to add a further safety margin. Once this predetermined decision height has been chosen by the pilot, the locating means 12 performance necessary for flying the autonomous approach as far as this predetermined decision height is determined. To do this, it is for example possible to use a process inverse to that described previously for determining the minimum decision height Hmin on the basis of the performance of said locating means 12. Said predetermined value of performance is chosen equal to the value thus determined of the performance of the locating means 12. This second variant makes it possible to adapt the monitoring of the performance level to the performance required to fly the autonomous approach as far as a decision height chosen by the pilot.

The invention claimed is:

1. A method of aiding the piloting of an aircraft, which is intended to aid the piloting of the aircraft during an autonomous approach to a landing runway for the Purpose of landing, said aircraft comprising at least one locating unit, wherein:
   a) an estimated instant of arrival of the aircraft on the runway is determined;

b) a prediction of the performance of said locating unit of the aircraft at least at the instant of arrival is determined; and c) on the basis of said performance of the locating unit and of characteristics of said approach, at least one minimum decision height corresponding to the instant of arrival is determined, above which the aircraft is protected from the risks of collision with the ground when it is guided automatically onto an approach axis corresponding to said approach, wherein:

in step a), a plurality of instants lying in a time interval surrounding said instant of arrival of the aircraft on the runway is determined;

in step b), a performance of said locating unit of the aircraft at each of said instants determined in step a) is determined; and in step c), a minimum decision height at each of said instants is determined on the basis of said performance of said locating unit of the aircraft at each instant considered and of said characteristics of the approach.

2. The method as claimed in claim 1, wherein, moreover, in a step d), at least this minimum decision height is presented to a pilot of the aircraft on a viewing screen of a viewing unit of the cockpit of the aircraft.

3. The method as claimed in claim 2, wherein, furthermore, in step d), at least said decision height corresponding to each of said instants is presented to a pilot of the aircraft on the a viewing screen of the viewing unit of the cockpit of the aircraft.

4. The method as claimed in claim 1, wherein steps a), b), and c), are performed repetitively during the flight of the aircraft, starting from a moment at which the autonomous approach considered is inserted into the flight plan of the aircraft.

5. The method as claimed in claim 1, wherein, in step c), said characteristics of the approach comprise a predetermined correspondence table making it possible to determine a minimum decision height on the basis of the performance of the locating unit of the aircraft, and the correspondence table is used to determine the minimum decision height on the basis of the prediction, determined in step b) of the performance of the locating unit at the instant of arrival of the aircraft on the runway.

6. The method as claimed in claim 1, wherein, furthermore, the aircraft is guided automatically onto the approach axis corresponding to said approach, until said minimum decision height is attained.

7. The method as claimed in claim 6, wherein when the aircraft attains the minimum decision height, in the absence of any action from the pilot to manually continue the descent towards the landing runway, an alarm is emitted in the cockpit of the aircraft.

8. The method as claimed in claim 1, wherein during the autonomous approach, the value of the actual performance of said locating unit of the aircraft is monitored and an alarm is emitted if said value is less than a predetermined value of performance.

9. The method as claimed in claim 8, wherein said predetermined value of performance is chosen equal to the predicted value of the performance, determined in step b).

10. The method as claimed in claim 8, wherein said predetermined value of performance is chosen equal to a value corresponding to performance making it possible to fly this autonomous approach as far as a predetermined decision height.

11. A device to aid the piloting of an aircraft, said device comprising:

a standard locating unit, comprising at least one satellite locating unit;

a database which contains at least information relating to a set of autonomous approaches;

a flight management system which receives information from said database and which comprises:

a calculating unit to calculate an instant of arrival of the aircraft on the runway;

a predicting unit to predict the performance of said satellite locating unit at said instant of arrival of the aircraft on the runway;

a calculating unit to calculate, on the basis of said performance of the satellite locating unit and of characteristics of the autonomous approach considered, which emanate from said database, a minimum decision height, corresponding to the instant of arrival, above which the aircraft is protected from the risks of collision with the ground when it is guided automatically on an approach axis corresponding to the autonomous approach considered, wherein:

a plurality of instants lying in a time interval surrounding said instant of arrival of the aircraft on the runway is determined;

a performance of said locating unit of the aircraft at each of said instants is determined; and a minimum decision height at each of said instants is determined on the basis of said performance of said locating unit of the aircraft at each instant considered and of said characteristics of the approach.

12. The device to aid piloting as claimed in claim 11, wherein the database is integrated into the flight management system.

13. The device to aid piloting as claimed in claim 11, which comprises a guidance system comprising a comparison unit to compare the value of the actual performance of said locating unit with a predetermined value of performance, able to emit an alarm when said value of the actual performance is less than said predetermined performance value.

14. An aircraft capable of flying an autonomous approach to a landing runway for the purpose of landing, comprising a device as claimed in claim 11 to aid piloting and landing of the aircraft on the landing runway.

15. A method of aiding the piloting of an aircraft, which is intended to aid the piloting of the aircraft during an autonomous approach to a landing runway for the purpose of landing, said aircraft comprising at least one locating unit, said method comprising:

a) determining an estimated instant of arrival of the aircraft on the runway;

b) determining a prediction of the performance of said locating unit of the aircraft at least at the instant of arrival; and c) determining, on the basis of said performance of the locating unit and of characteristics of said approach, at least one minimum decision height corresponding to the instant of arrival, above which the aircraft is protected from the risks of collision with the environment when it is guided automatically onto an approach axis corresponding to said approach, wherein, in step c), said characteristics of the approach comprise OAS protection surfaces and a published decision height, and wherein, in step c), to determine a minimum decision height at an instant:

c1) a first zone of uncertainty of position of the aircraft is determined, corresponding to the precision of the location component of a precision instrument approach which would have the approach axis of said autonomous approach as approach axis;

c2) a second zone of uncertainty of position of the aircraft is determined at least on the basis of the performance of the positioning system at the instant; and c3) said minimum decision height is determined in such a way that a margin between the first position uncertainty zone and the OAS protection surfaces corresponds to a margin between the second position uncertainty zone and the OAS protection surfaces.

16. The method as claimed in claim 15, wherein, in step c3), the minimum decision height corresponds to:
the height of a point of the approach axis for which the margin between the first position uncertainty zone and the OAS protection surfaces corresponds to the margin between the second position uncertainty zone and the GAS protection surfaces if said height is greater than or equal to the published decision height for this approach and if said point of the approach axis can be determined;
the published decision height otherwise.

17. The method as claimed in claim 15, wherein, in step c3):

c3a) the margin between the first position uncertainty zone and the OAS protection surfaces at the point of the approach axis whose height is equal to the published decision height is determined;

c3b) a point of the approach axis for which the margin between the second position uncertainty zone and the OAS protection surfaces corresponds to the margin determined in step c3a) is determined;

c3c) the minimum decision height is determined equal to:
the height of the point determined in step c3b) if the latter is greater than or equal to the published decision height;
the published decision height otherwise.

18. The method as claimed in claim 15, wherein the published decision height is dependent at least on the category of said instrument approach.

19. A device to aid the piloting of an aircraft, said device comprising:

a standard locating unit, comprising at least one satellite locating unit;

a database which contains at least information relating to a set of autonomous approaches;

a flight management system which receives information from said database and which comprises:

a calculating unit to calculate an instant of arrival of the aircraft on the runway;

a predicting unit to predict the performance of said satellite locating unit at said instant of arrival of the aircraft on the runway; and a calculating unit to calculate, on the basis of said performance of the satellite locating unit and of characteristics of the autonomous approach considered, which emanate from said database, a minimum decision height, corresponding to the instant of arrival, above which the aircraft is protected from the risks of collision with the environment when it is guided automatically on an approach axis corresponding to the autonomous approach considered, wherein said characteristics of the approach comprise OAS protection surfaces and a published decision height, and wherein, to determine a minimum decision height at an instant:

c1) a first zone of uncertainty of position of the aircraft is determined, corresponding to the precision of the location component of a precision instrument approach which would have the approach axis of said autonomous approach as approach axis;

c2) a second zone of uncertainty of position of the aircraft is determined at least on the basis of the performance of the positioning system at the instant; and c3) said minimum decision height is determined in such a way that a margin between the first position uncertainty zone and the OAS protection surfaces corresponds to a margin between the second position uncertainty zone and the OAS protection surfaces.

* * * * *